(12) United States Patent
Illés et al.

(10) Patent No.: US 10,843,724 B2
(45) Date of Patent: Nov. 24, 2020

(54) BALL SCREW DRIVE OF AN ELECTROMECHANICAL POWER STEERING DEVICE WITH DEFLECTING BODIES FOR A BALL RETURN

(71) Applicants: THYSSENKRUPP PRESTA AG, Eschen (LI); thyssenkrupp AG, Essen (DE)

(72) Inventors: András Illés, Gams (CH); Wolfram Raither, Buchs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 211 days.

(21) Appl. No.: 16/309,398

(22) PCT Filed: Jun. 22, 2017

(86) PCT No.: PCT/EP2017/065358
§ 371 (c)(1),
(2) Date: Dec. 12, 2018

(87) PCT Pub. No.: WO2017/220713
PCT Pub. Date: Dec. 28, 2017

(65) Prior Publication Data
US 2019/0329815 A1  Oct. 31, 2019

(30) Foreign Application Priority Data
Jun. 22, 2016  (DE) .................. 10 2016 007 542

(51) Int. Cl.
*B62D 5/04*  (2006.01)
*B62D 3/12*  (2006.01)
(Continued)

(52) U.S. Cl.
CPC .......... *B62D 5/0424* (2013.01); *B62D 3/126* (2013.01); *B62D 5/006* (2013.01);
(Continued)

(58) Field of Classification Search
CPC .... B62D 5/0448; B62D 5/0424; B62D 3/126; B62D 5/006; F16H 25/2214; F16H 25/2219; F16H 19/04; F16H 2025/2096
See application file for complete search history.

(56) References Cited

U.S. PATENT DOCUMENTS 5,809,838 A * 9/1998 Miyaguchi .......... F16H 25/2214
74/89.44
6,439,338 B2 * 8/2002 Yoshioka ............. B62D 5/0448
180/444
(Continued)

FOREIGN PATENT DOCUMENTS

CN  1688472 A  10/2005
CN  2849305 Y  12/2006
(Continued)

OTHER PUBLICATIONS

International Search Report issued in PCT/EP2017/065358, dated Sep. 20, 2017.

*Primary Examiner* — Ruth Ilan
*Assistant Examiner* — Michael R Stabley
(74) *Attorney, Agent, or Firm* — thyssenkrupp North America, LLC

(57) ABSTRACT

An electromechanical power steering device may include a servomotor that drives an axially movable component via a ball nut mounted in a bearing such that the ball nut can be rotated about a longitudinal axis in a housing. The ball nut may be engaged with a threaded spindle configured on the axially movable component. The ball nut may include a ball screw on its inner side for balls to roll on, and an external ball return means that connects a start of the ball screw to an
(Continued)

end of the ball screw to make endless circulation of the balls possible. A return channel of the ball return means may be formed by way of a deflecting body and a pulley wheel.

14 Claims, 4 Drawing Sheets

(51) Int. Cl.
    *B62D 5/00*     (2006.01)
    *F16H 25/22*     (2006.01)
    *F16H 19/04*     (2006.01)
    *F16H 25/20*     (2006.01)

(52) U.S. Cl.
    CPC ......... *F16H 25/2219* (2013.01); *F16H 19/04* (2013.01); *F16H 2025/2096* (2013.01)

(56) References Cited

U.S. PATENT DOCUMENTS

| | | | |
|---|---|---|---|
| 6,874,939 B2* | 4/2005 | Michioka | F16C 29/0609 384/45 |
| 7,040,189 B2* | 5/2006 | Michioka | F16C 33/3706 74/424.82 |
| 7,357,048 B2* | 4/2008 | Hartig | B62D 5/0448 74/424.83 |
| 8,266,975 B2* | 9/2012 | Sip | F16M 11/22 74/89.23 |
| 8,291,786 B2* | 10/2012 | Adler | F16H 25/2214 74/424.86 |
| 8,955,404 B2* | 2/2015 | Kuo | F16H 25/2238 74/424.86 |
| 2003/0172759 A1* | 9/2003 | Hayashi | F16H 25/2214 74/424.86 |
| 2004/0200303 A1* | 10/2004 | Inoue | F16H 25/2204 74/424.75 |
| 2005/0252320 A1* | 11/2005 | Hartig | F16H 25/2214 74/89.23 |
| 2009/0265885 A1 | 10/2009 | Robertson | |
| 2009/0294203 A1 | 12/2009 | Okada | |
| 2013/0118827 A1 | 5/2013 | Imanishi | |
| 2013/0233103 A1 | 9/2013 | Asakura | |
| 2015/0060188 A1 | 3/2015 | Kitamura | |
| 2015/0183455 A1 | 7/2015 | Wang | |
| 2015/0308504 A1 | 10/2015 | Katsaros | |
| 2015/0329138 A1 | 11/2015 | Peterreins | |
| 2016/0031473 A1 | 2/2016 | Riepold | |
| 2016/0195134 A1 | 7/2016 | Spies | |

FOREIGN PATENT DOCUMENTS

| | | |
|---|---|---|
| CN | 101001778 A | 7/2007 |
| CN | 201021709 Y | 2/2008 |
| CN | 201437373 U | 4/2010 |
| CN | 103112490 A | 5/2013 |
| CN | 103303360 A | 9/2013 |
| CN | 203770410 U | 8/2014 |
| CN | 203793407 U | 8/2014 |
| CN | 104417609 A | 3/2015 |
| CN | 204452566 U | 7/2015 |
| CN | 105008208 A | 10/2015 |
| CN | 105179485 A | 12/2015 |
| CN | 105673698 A | 6/2016 |
| DE | 102007048075 A | 4/2009 |
| DE | 102007049114 A | 4/2009 |
| EP | 1596100 A | 11/2005 |
| EP | 1659312 B | 5/2006 |
| EP | 2594457 A | 5/2013 |
| EP | 2713078 B | 4/2014 |
| WO | 0202390 A | 1/2002 |
| WO | 2009046792 A | 4/2009 |

* cited by examiner

BALL SCREW DRIVE OF AN ELECTROMECHANICAL POWER STEERING DEVICE WITH DEFLECTING BODIES FOR A BALL RETURN

CROSS REFERENCE TO RELATED APPLICATIONS

This application is a U.S. National Stage Entry of International Patent Application Serial Number PCT/EP2017/065358, filed Jun. 22, 2017, which claims priority to German Patent Application No. DE 10 2016 007 542.2, filed Jun. 22, 2016, the entire contents of both of which are incorporated herein by reference.

FIELD

The present disclosure generally relates to steering systems, including electromechanical power steering devices.

BACKGROUND

In electromechanical power steering devices, a torque is generated by an electric motor, which torque is transmitted to a gear mechanism, and the steering torque which is introduced by the driver is superimposed therein.

An electromechanical power steering device of the generic type has a servomotor which acts on a ball nut of a ball screw drive. The ball nut is in engagement via circulating balls with a ball screw which is arranged on the outer circumference of a rack which is part of a rack and pinion steering system. A rotation of the ball nut brings about an axial movement of the rack, as a result of which a steering movement of the driver is assisted. The ball screw drive is preferably coupled via a toothed belt to the electric motor.

EP 1 659 312 B1 discloses a ball screw drive, in the case of which a deflecting body is disclosed which conveys the balls via a ball return means back into the ball nut. The deflecting body is manufactured from plastic and is plugged from the outside into a main body of the ball nut. Here, the deflecting body projects beyond the outer circumference of the metallic main body of the ball nut. Recesses are provided in the interior of the toothed belt pulley in order to fasten the deflecting body in the ball nut.

Patent specification EP 2 713 078 B1 has disclosed a ball screw drive with a ball return means. On the inner side, the toothed belt pulley has a recess for receiving the ball return means and two webs as an anti-rotation safeguard.

Thus a need exists for an electromechanical power steering device with a ball screw drive where a ball return means is more durable and less expensive.

DETAILED DESCRIPTION

Figure 1:
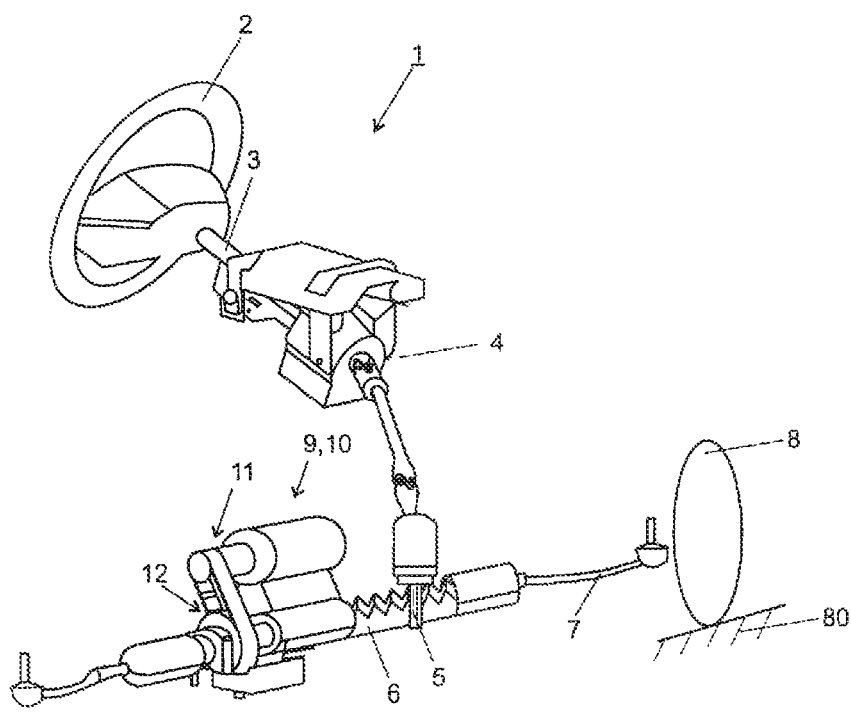
FIG. 1 is a diagrammatic view of an example electromechanical power steering device with a ball screw drive.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, an electromechanical power steering device is provided, for a motor vehicle, with a servomotor which drives an axially movable component via a ball nut which is mounted in a bearing such that it can be rotated about the longitudinal axis in a housing, the ball nut being in engagement with a threaded spindle which is configured on the component, and having a ball screw on its inner side for balls to roll on, and with an external ball return means which connects the start of the ball screw to the end of the ball screw, in order to make an endless circulation of the balls possible, and with a deflecting body, a return channel of the ball return means being formed by way of the deflecting body and a pulley wheel.

Said arrangement is particularly compact and inexpensive, since the pulley wheel forms a part of the return channel. In addition, the pulley wheel preferably consists of a sintered pulley wheel body, as a result of which the wear of the ball return means is reduced unlike in the case of plastic parts.

It is preferred if the deflecting body has at least two webs on its outer side, which at least two webs engage into the pulley wheel in such a way that a torque can be transmitted from the pulley wheel to the ball nut.

Furthermore, it is preferred that the deflecting body has at least two webs on its inner side, which at least two webs engage in operation into corresponding recesses of the ball nut and therefore ensure the transmission of the torque.

The webs preferably extend in the longitudinal direction. It can be provided here that the webs of the one side and the webs of the other side are arranged offset with respect to one another in the longitudinal direction.

In one preferred embodiment, the webs of the underside are snap-action elements and enter into a snap-action connection with the respective recess of the ball nut.

The webs are preferably configured in one piece from a single component, with preference are configured integrally with the deflecting body in a manner which is formed from a single material.

It can be provided, furthermore, that the deflecting body has pins for positioning the deflecting body on the ball nut. Said pins preferably engage into recesses of the ball screw which are provided for the entry and exit of balls for the external return to the opposite end of the ball screw. In particular, the pins can have a pin inlet, at which the balls to be deflected come into contact first of all with the deflecting body.

The bearing is preferably a double-row angular contact ball bearing with at least one bearing inner ring and two bearing outer rings, the pulley wheel and the deflecting body being arranged between the bearing outer rings. This results in a particularly compact arrangement.

In order to configure the bearing to be resistant to tilting, it can be provided that the contact angles of the double-row angular contact ball bearing are selected in such a way that a supporting spacing of greater than zero is configured.

Furthermore, it is advantageous if the two bearing outer rings are received in a sleeve which is arranged in a bearing seat of the housing. Here, said sleeve is preferably configured in such a way that it can compensate for thermal expansions between the mechanism housing and the ball nut.

In one preferred embodiment, the component is a rack of a rack and pinion steering mechanism.

FIG. 1 diagrammatically shows an electromechanical motor vehicle steering device 1 with a steering wheel 2 which is coupled in a torque-proof manner to an upper steering shaft 3 and a lower steering shaft 4. The upper steering shaft 3 is functionally connected via a torsion bar to the lower steering shaft 4. The lower steering shaft 4 is connected in a torque-proof manner to a pinion 5. The pinion 5 meshes in a known way with a toothed segment 6' of a rack 6. The rack 6 is mounted in a steering housing such that it can be displaced in the direction of its longitudinal axis. At its free end, the rack 6 is connected to track rods 7 via ball joints (not shown). The track rods 7 themselves are connected in a known way via steering knuckles to in each case one steered wheel 8 of the motor vehicle. A rotation of the steering wheel 2 leads via the connection of the steering shaft 3, 4 and the pinion 5 to a longitudinal displacement of the rack 6 and therefore to pivoting of the steered wheels 8. The steered wheels 8 experience a reaction via a roadway 80, which reaction counteracts the steering movement. As a consequence, a force is required to pivot the wheels 8, which force makes a corresponding torque on the steering wheel 2 necessary. An electric motor 9 of a servo unit 10 is provided, in order to assist the driver during said steering movement. To this end, the electric motor 9 drives a ball nut 13 of a ball screw drive 12 via a belt drive 11. A rotation of the nut sets the threaded spindle of the ball screw drive 12, which threaded spindle is part of the rack 6, in an axial movement which ultimately brings about a steering movement for the motor vehicle.

Even if an electromechanical power steering device with a mechanical coupling between the steering wheel 2 and the steering pinion 5 is shown here in the example, the invention can also be applied to motor vehicle steering devices, in which there is no mechanical coupling. Steering systems of this type are known under the term steer-by-wire.

Figure 2:
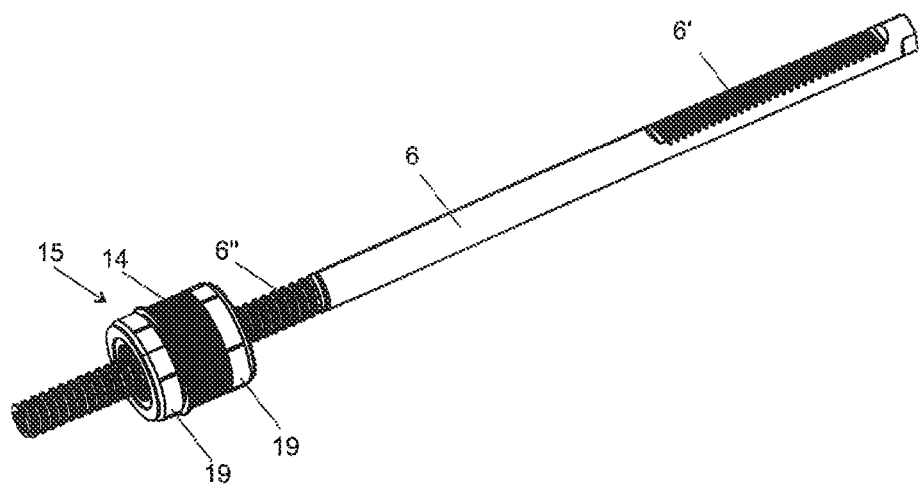
FIG. 2 is a three-dimensional view of an example ball screw drive without an enclosing housing.

FIG. 2 shows the ball screw drive in three-dimensional form. A threaded spindle 6" is part of the rack 6 and is arranged spaced apart from the toothed segment 6'. The ball nut 13 has a pulley wheel 14 on its outer circumferential face.

Figure 3:
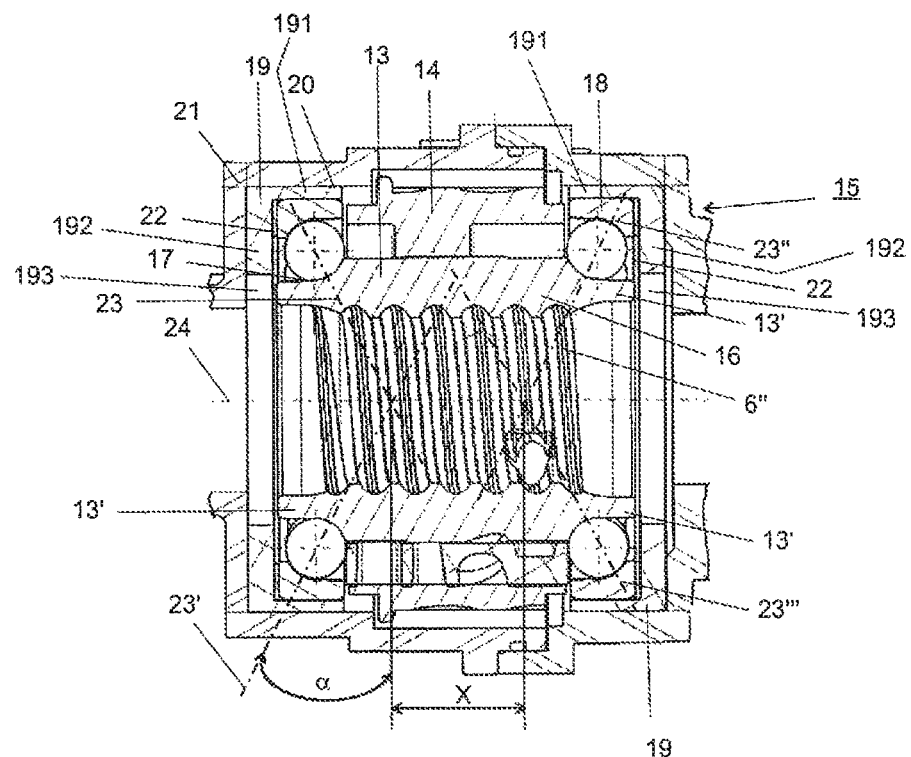
FIG. 3 is a longitudinal sectional view through an example ball screw drive.

FIG. 3 shows the ball nut 13 and the threaded spindle 6" in a longitudinal section. The ball nut 13 is mounted rotatably in a double-row angular contact ball bearing 15. The bearing 15 has a single common inner ring 16 which is formed by way of the ball nut 13. To this end, the ball nut 13 has in each case one circumferential recess 17 for a ball raceway at its ends 13' on its outer circumferential face 16. Here, the recess 17 or the raceway profile is configured in accordance with an angular contact ball bearing. The raceway profile 17 and/or the sleeve of the angular contact ball bearing can be configured as an ogival profile, with the result that a punctiform contact is produced between the raceway and the balls 100. As a result, a uniform load distribution, a high rigidity and improved running properties with more accurate guidance are made possible. The balls preferably have a two-point contact between the recess 17 and the sleeve 19. There can further preferably be a four-point contact between the ends 13' of the ball nut 13 and the sleeve. To this end, the end 13' of the ball nut can be configured as a funnel shape.

Furthermore, the bearing 15 has two separate outer rings 18. The outer rings 18 are received in each case in a separate sleeve 19 which is arranged in a bearing seat 20 of the housing 21. The pulley wheel 14 of the toothed belt drive 11 is fastened in a torque-proof manner on the ball nut 13. The sleeve 19 is preferably formed from a material which has a greater thermal expansion than aluminum and steel. In particular, the sleeve 19 is preferably formed from a plastic, particularly preferably from PA66GF30 (polyamide 66 with glass fiber reinforcement with a 30% volume share). It is preferably manufactured from plastic and compensates for thermal expansions between the mechanism housing 21 and the ball nut drive 12. The sleeve preferably comprises a circular-cylindrical circumferential wall 191 which encloses the bearing 15 and the bearing axis 24, and a circular-cylindrical bottom region 192 which extends radially inward in the direction of the bearing axis 24 and has a circular-cylindrical opening 193 which encloses the bearing axis 24. Here, the two separate sleeves 19 are preferably arranged in such a way that the two bearings 15 are arranged between the two bottom regions 192. The bottom regions 192 are preferably of planar configuration with a preferably constant thickness. It is also conceivable and possible, however, to provide the bottom regions in a targeted manner with grooves, engravings or ribs or an undulating shape, in order, for example, to influence the lubrication and/or the thermal properties in a targeted manner.

For further improvement of the compensation properties, the sleeve can have recesses in its circumferential wall 191, preferably slots 194 which extend in the direction of the bearing axis 24. Said slots preferably run as far as to that open end of the circumferential wall 191 which is directed away from the bottom region 192. In other words, the slots 194 are open in the direction of the pulley wheel 14.

The sleeve 19 is preferably formed in one piece from a single component, is preferably formed integrally from a single material, and is particularly preferably formed in an injection molding method.

Figure 4:
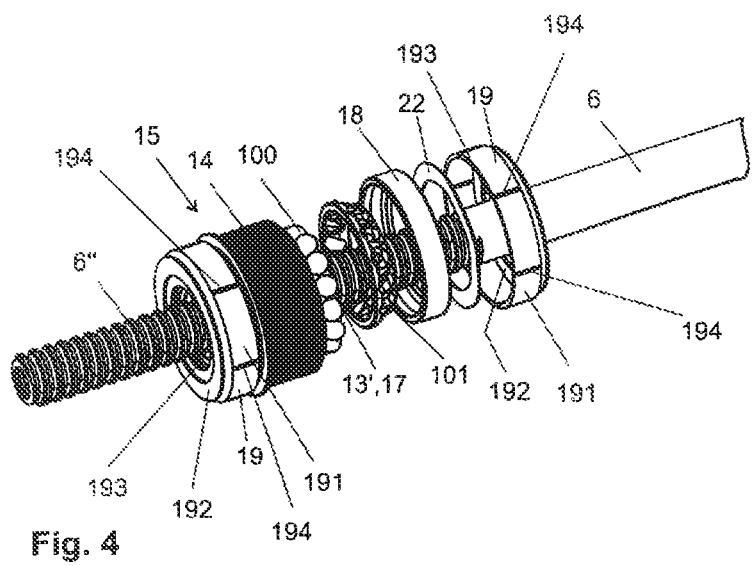
FIG. 4 is a partially exploded view of an example angular contact ball bearing in accordance with FIGS. 2 and 3.

As shown in FIG. 4, a corrugated spring 22 is arranged in the sleeve 19 in the preferred embodiment, which corrugated spring 22 prestresses the bearing 15 in the axial direction. The corrugated spring 22 lies between the sleeve 19 and the bearing outer ring 18. The attachment rigidity can be set by way of the combination of the sleeve 19 and the corrugated spring 22. In addition, said combination makes damping of the movement of the bearing 15 in the case of dynamic loads possible.

Depending on the application, however, said corrugated spring 22 can be replaced by way of a cup spring or by way of a combination of a cup spring and a corrugated spring.

The balls 100 of the angular contact ball bearing 15 are guided in a ball cage 101.

The raceways of the double-row angular contact ball bearing 15 are configured in such a way that the connecting lines 23, 23', 23", 23''' of the contact points between the ball and the raceways intersect the bearing axis 24 so as to lie between the outer rings 18. A predefined supporting spacing X is formed between the two intersection points with the bearing axis 24. The bearing 15 becomes particularly resistant to tilting as a result of the great supporting spacing X. For a particularly high tilting resistance, the supporting spacing X preferably lies in an interval between one time and three times the diameter of the balls 100 of the angular contact bearing. A supporting distance which corresponds to twice the diameter of the balls 100 of the angular contact ball bearing is to be particularly preferred. The contact area of the ball 100 on the raceway face 17 and an inner face of the sleeve preferably corresponds to a quarter of a ball circumferential area. An undercut which is not contacted by the ball preferably remains both on the raceway face and on the inner face of the sleeve. The angle which connecting line of the two contact points between the ball 100 and the raceways encloses with the radial plane and at which the loading is transmitted from one raceway to the other is called the contact angle $\alpha$. The contact angle is preferably of equal magnitude for both rows of the bearing 15. The optimum tilting resistance of the bearing 15 can be set at a defined contact angle $\alpha$ by way of a predefined value of the supporting spacing X.

FIGS. 5 to 8 show the ball nut 13 and a ball return means 25 in detail. The details show the rack 6 with the ball screw 6" and the ball screw drive which is arranged thereon without a pulley wheel.

Figure 5:
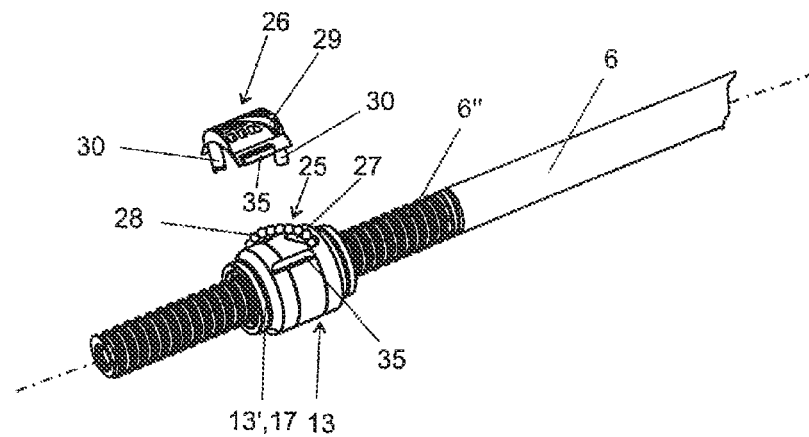
FIG. 5 is a partially exploded view of an example ball screw drive with a ball return means in accordance with FIGS. 2 and 3.

FIG. 4 shows the ball nut 13 with a deflecting body 26 placed on it. On its inner side, the ball nut 13 bears a ball screw, in which balls roll in a manner known per se. The ball nut 13 has two through recesses 27. In each case one recess 27 is provided for the entry and exit of balls 28 for the external ball return means to the opposite end of the ball screw. The ball return means 25 which connects the two recesses 27 to one another is formed at least partially by way of the deflecting body 26. The ball return means 25 is of U-shaped configuration. The return channel is formed at least partially by way of a recess 29 in the deflecting body 26 and two pins 30 which adjoin it. The pins have in each case one pin inlet 301. The recess 29 is arranged diagonally over the deflecting body 26 which is adapted as an attachment on its inner side to the curvature of the upper side of the ball nut 13, and extends in the circumferential direction over a limited sector of the ball nut 13. As shown in FIG. 5, the deflecting body 26 is inserted by means of the pins 30 into the two recesses 27 of the ball nut 13, with the result that the ball return means 25 is connected to both ends of the ball screw.

The pins 30 are preferably oriented at an angle $\beta$, with the result that the pins 30 are inserted with prestress into the recesses 27, the prestress prestressing the pin inlet 301 into the recess 27. As a result, the transition of the balls 28 into the return channel 25' is improved. In particular, the requirements of the manufacturing tolerances for the deflecting body can be lowered as a result.

The deflecting body can be configured or penetrated with honeycomb-like cutouts or depressions on the upper side and/or on the underside.

Figure 7:
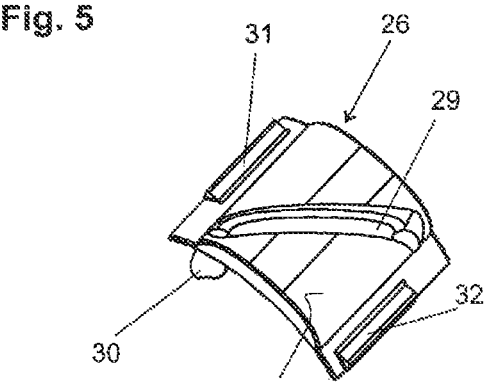
FIG. 7 is a top perspective view of an example ball return means.
Figure 6:
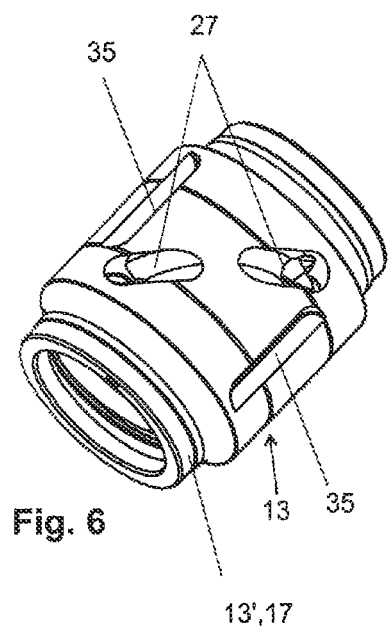
FIG. 6 is a perspective view of an example ball nut.
Figure 8:
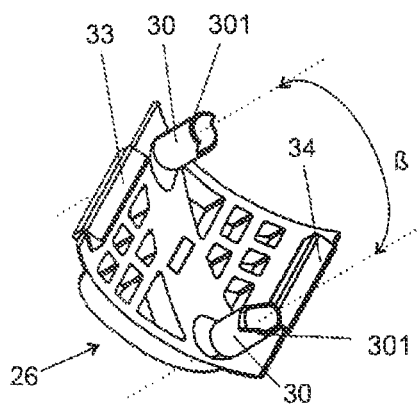
FIG. 8 is a bottom perspective view of an example ball return means.
Figure 9:
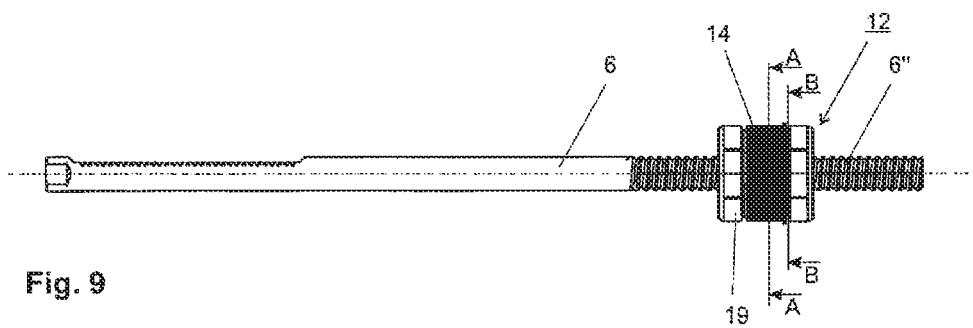
FIG. 9 is a side view of an example ball screw drive.
Figure 10:
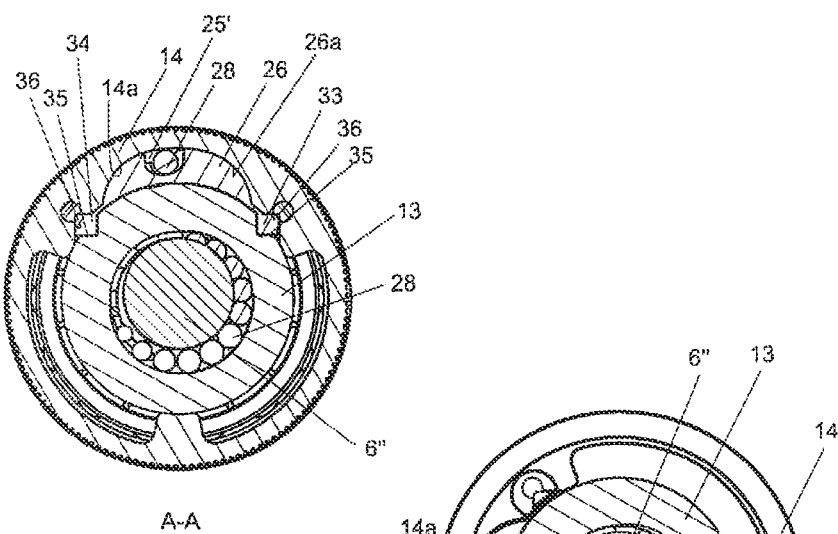
FIG. 10 is a cross-sectional view along line AA of the example ball screw drive in FIG. 9.
Figure 11:
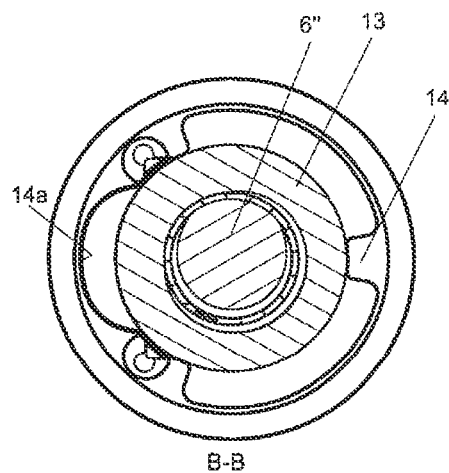
FIG. 11 is a cross-sectional view along line BB of the example ball screw drive in FIG. 9.

FIGS. 6 to 8 show the ball nut 13 and the deflecting body 26 which is placed on it in detail. In addition to the pin 30, the deflecting body 26 has laterally arranged webs 31, 32, 33, 34. The webs 31, 32, 33, 34 extend in the longitudinal direction 24 of the ball nut 13, and in each case two webs 31, 32 are arranged on the upper side and two webs 33, 34 of the deflecting body 26 are arranged on the underside, which webs are preferably configured in one piece with the deflecting body 26. The webs of the right-hand side 31, 34 are preferably offset in the longitudinal direction 24 with respect to the webs of the left-hand side 32, 33, and are preferably arranged in a point-symmetrical manner. The deflecting body 26 is preferably formed from plastic, particularly preferably from PA66GF30 (polyamide 66 with glass fiber reinforcement with a 30% volume share). The webs of the underside 33, 34 engage in each case into matching elongate recesses 35 in the ball nut 13. Said webs 33, 34 are preferably configured as a snap-action element and latch into the recess of the ball nut, a positively-locking connection being achieved by way of elastic deformation of the webs. It can be provided that the webs of the underside 33, 34 assume an angle of greater than zero with respect to one another, in order to form an improved prestress as a result. As shown in FIGS. 9 to 11, the webs on the upper side 31, 32 engage into corresponding recesses 36 of the pulley wheel 14. They form an anti-rotation safeguard and support for the pulley wheel 14 by means of a positively-locking connection. The transmission of torque from the pulley wheel to the ball nut takes place exclusively via the webs 31, 32 and the corresponding recesses 36 in the pulley wheel 14, and the arcuate shape in the surface 26a in the deflecting body 26 in contact with an indentation 14a of the pulley wheel 14. The return channel 25' of the ball return means 25 is formed by the deflecting body 26 and the inner side of the pulley wheel 14, and preferably by the indentation 14a. The recess 29 is covered toward the top by the pulley wheel, in particular by its indentation 14a, with the result that a closed return channel 25' is configured. For this purpose, the pulley wheel has a corresponding profile on its inner side. An intermediate element made from plastic which is formed in a single piece from a single component, preferably integrally from a single material, or a two-piece intermediate element can be provided between the pulley wheel 14 and the ball return means, which intermediate element corresponds on the outer circumference with the profile on the inner side of the pulley wheel and is secured axially as a result. The return channel 25' is received and closed by way of the crowned inner contour of the intermediate element. As a result, the balls 28 can move along the U-shaped track and are held in the channel. The interference fit can be reduced by way of the intermediate element. The division of the return channel 25' between the deflecting body 26 and the sleeve runs in the outer contact plane of the balls 28. During assembly, first of all the deflecting body 26 is plugged onto the ball nut 13, and then the sleeve is pushed axially onto the ball nut 13. The assembly complexity is therefore very low. The number of necessary components of the ball screw drive is reduced by way of the use of the pulley wheel 14 as part of the return channel 25'. In addition, the surface of the pulley wheel, with which the balls come into contact in the return channel, is so hard and resistant that the wear is minimized, which considerably increases the service life of the return means.

The assembly of the pulley wheel and the ball nut can take place with a play-free seat without an interference fit as a result of the arrangement of the webs. This has the advantage that the ball nut is not disadvantageously deformed by way of the joining operation.

The bearing 15 of the ball nut 13 is configured in such a way that the deflecting body 26 can be arranged between the ball nut and the pulley wheel. The ball return means and/or the deflecting body therefore have/has space within the double-row bearing, as a result of which the arrangement becomes particularly compact.

What is claimed is:

1. An electromechanical power steering device for a motor vehicle comprising:
    a servomotor that drives an axially movable component via a ball nut that is mounted in a bearing such that the ball nut is rotatable about a longitudinal axis in a housing, wherein the ball nut is engaged with a threaded spindle configured on the axially movable component, wherein an inner side of the ball nut includes a ball screw for balls to roll on, wherein an external ball return means of the ball nut connects a start of the ball screw to an end of the ball screw to enable endless circulation of the balls;
    a pulley wheel; and
    a deflecting body, wherein a return channel of the external ball return means is formed by way of the deflecting body and the pulley wheel;
    wherein an outer side of the deflecting body includes at least two outer webs that engage into the pulley wheel such that torque can be transmitted from the pulley wheel to the ball nut.

2. The electromechanical power steering device of claim 1 wherein an inner side of the deflecting body includes at least two inner webs that engage in operation into corresponding recesses of the ball nut.

3. The electromechanical power steering device of claim 2 wherein the at least two inner webs extend in a longitudinal direction.

4. The electromechanical power steering device of claim 2 wherein each of the at least two inner webs on the inner side of the deflecting body is a snap-action element that is in a snap-action connection with one of the corresponding recesses of the ball nut.

5. The electromechanical power steering device of claim 1 wherein an inner side of the deflecting body includes at least two inner webs that engage in operation into corresponding recesses of the ball nut, wherein the at least two outer webs on the outer side and the at least two inner webs on the inner side extend in a longitudinal direction, wherein at a first part of the deflecting body include a first of the at least two outer webs on the outer side and a first of the at least two inner webs on the inner side, are offset in the longitudinal direction relative to a second of the at least two outer webs on the outer side and a second of the at least two inner webs on the inner side at a second part of the deflecting body.

6. The electromechanical power steering device of claim 1 wherein an inner side of the deflecting body includes at least two inner webs that engage in operation into corresponding recesses of the ball nut, wherein the at least two outer webs of the outer side and the at least two inner webs of the inner side are configured in one piece with the deflecting body.

7. The electromechanical power steering device of claim 1 wherein the ball nut includes two recesses for entry and exit of the balls to externally return to an opposite end of the ball screw.

8. The electromechanical power steering device of claim 1 wherein the deflecting body comprises pins for positioning the deflecting body on the ball nut.

9. The electromechanical power steering device of claim 8 wherein the pins of the deflecting body engage into recesses of the ball nut that are configured for entry and exit of the balls to externally return to an opposite end of the ball screw.

10. The electromechanical power steering device of claim 1 wherein the bearing is a double-row angular contact ball bearing with a bearing inner ring and two bearing outer rings, wherein the pulley wheel and the deflecting body are disposed between the bearing outer rings.

11. The electromechanical power steering device of claim 10 wherein contact angles of the double-row angular contact ball bearing are configured such that a supporting spacing is formed.

12. The electromechanical power steering device of claim 10 wherein the two bearing outer rings are received in a sleeve disposed in a bearing seat of the housing.

13. The electromechanical power steering device of claim 12 wherein the sleeve is configured to compensate for thermal expansions between the housing and the ball nut.

14. The electromechanical power steering device of claim 1 wherein the axially movable component is a rack of a rack and pinion steering mechanism.

* * * * *